April 26, 1966  R. D. CRAWFORD ETAL  3,247,644
PARTS PACKAGING MACHINE
Filed Aug. 20, 1962                                    5 Sheets-Sheet 1
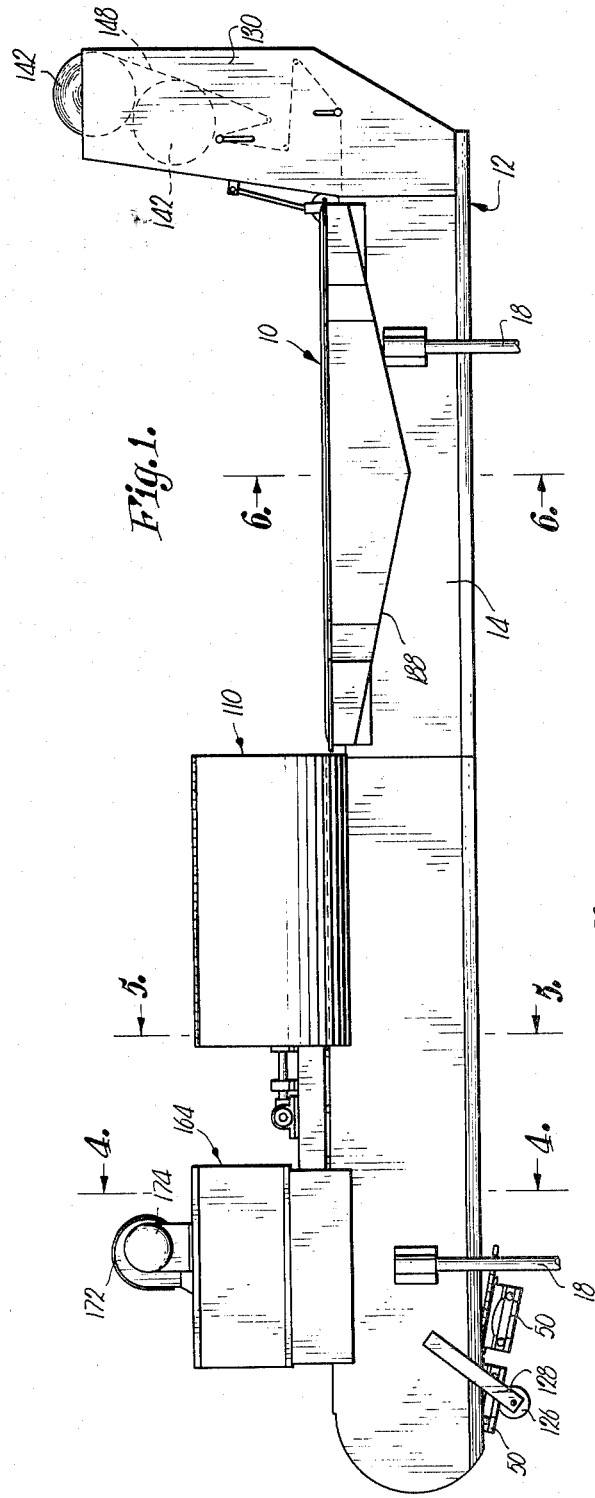
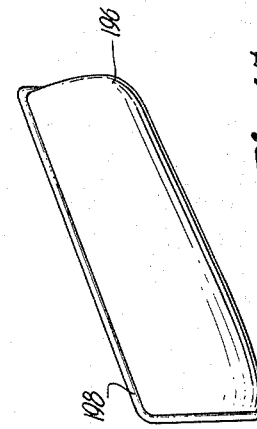
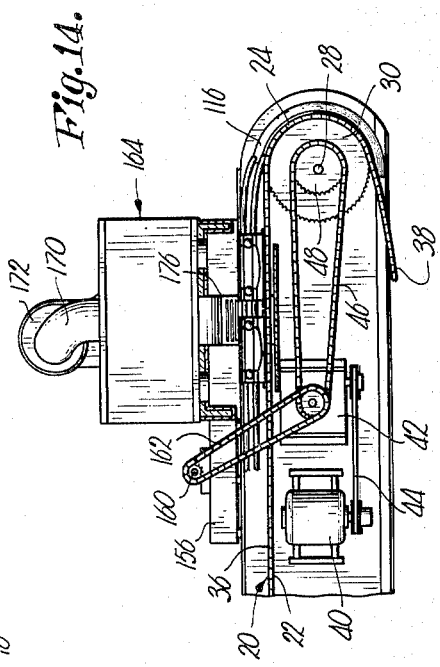
INVENTORS.
Robert D. Crawford
Glen R. Lenagar
BY Ralph S. Zebarth
ATTORNEYS.

April 26, 1966
R. D. CRAWFORD ETAL
3,247,644
PARTS PACKAGING MACHINE
Filed Aug. 20, 1962
5 Sheets-Sheet 2
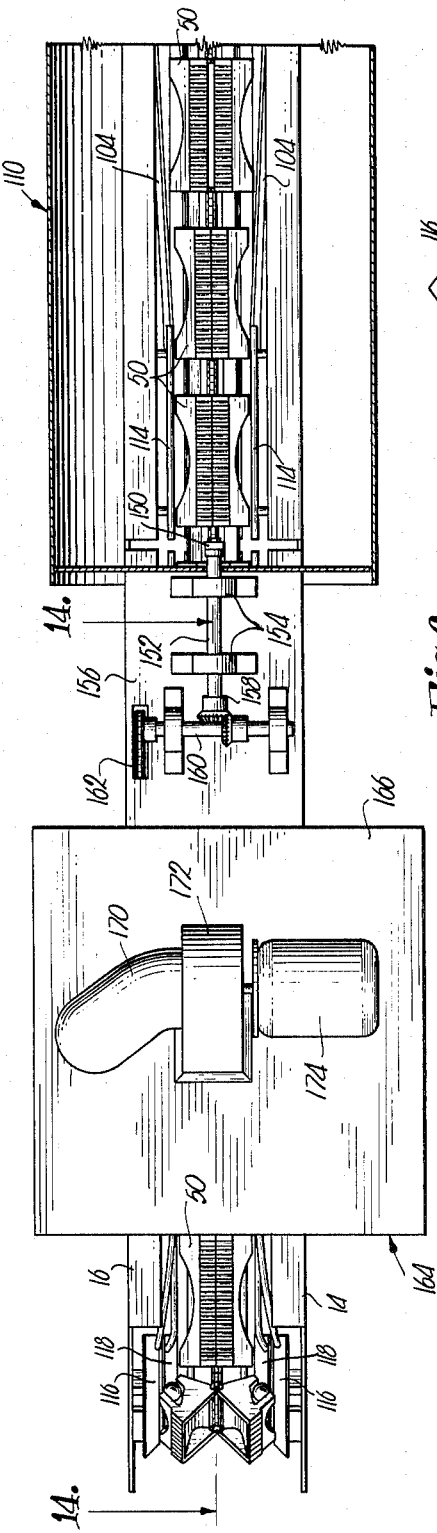
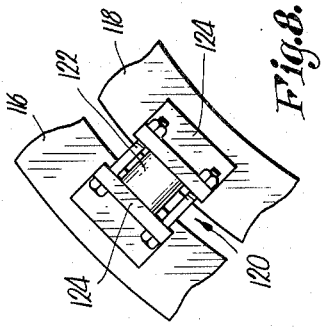
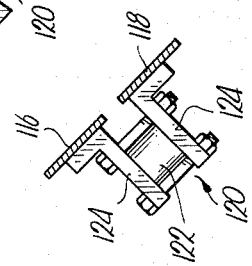
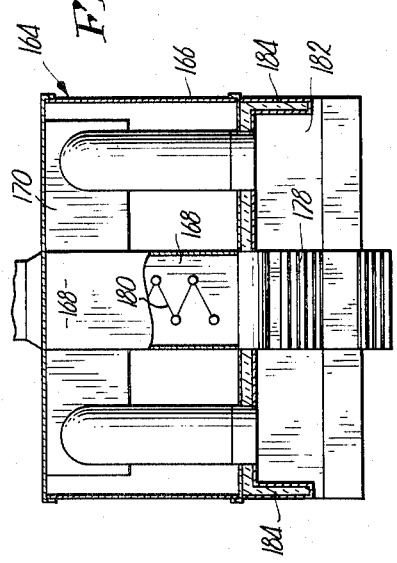
INVENTORS.
Robert D. Crawford
Glen R. Lenagar
Ralph S. Zebarth
BY
Hovey, Schmidt, Johnson & Hovey
ATTORNEYS.

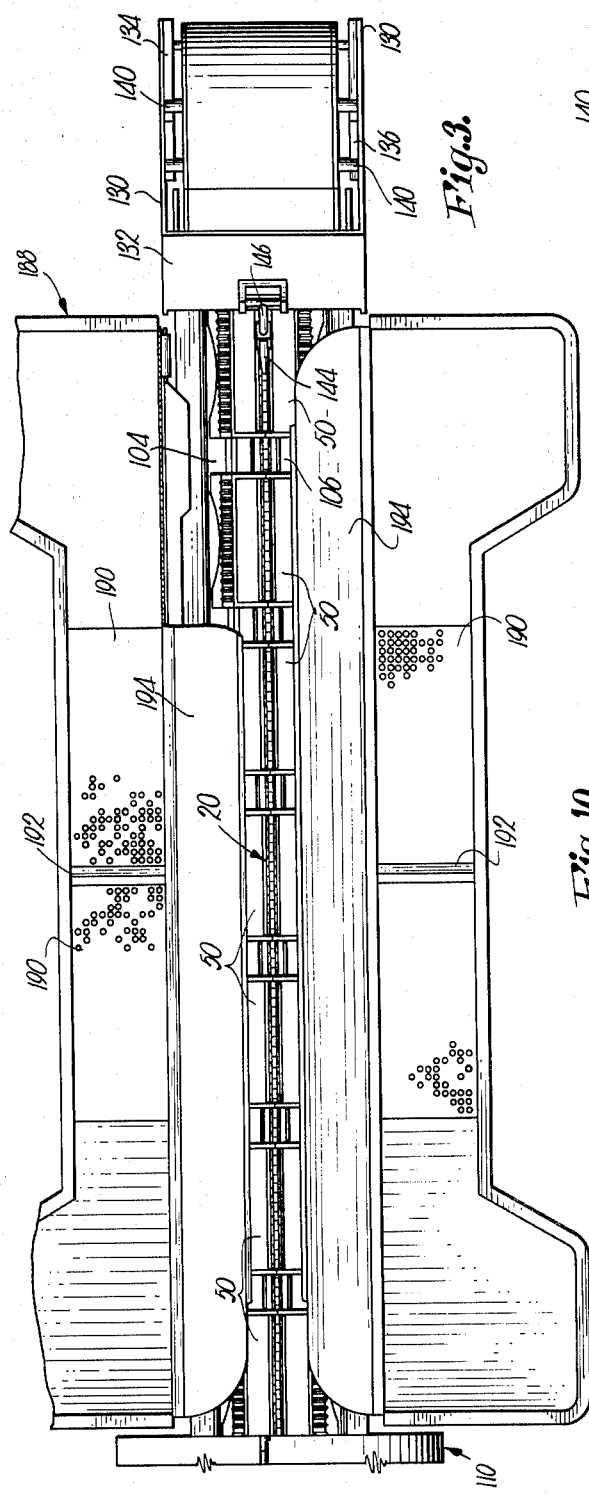
INVENTORS.
Robert D. Crawford
Glen R. Lenagar
Ralph S. Zebarth
BY
ATTORNEYS.

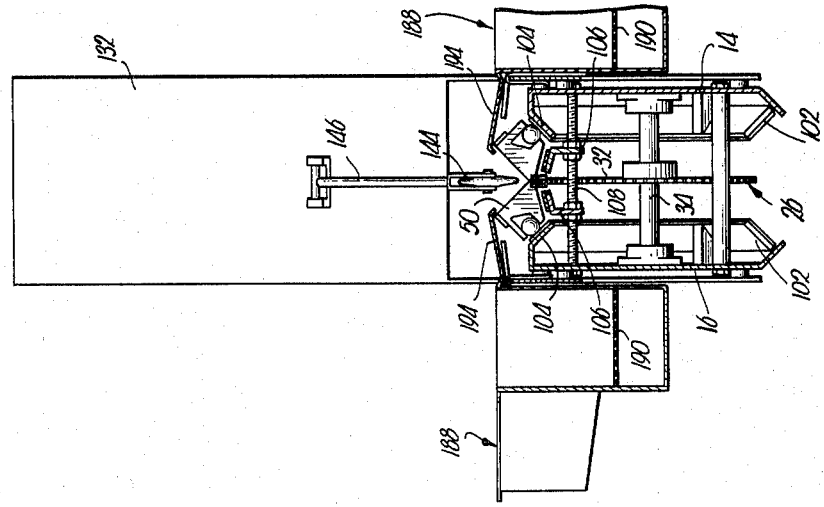

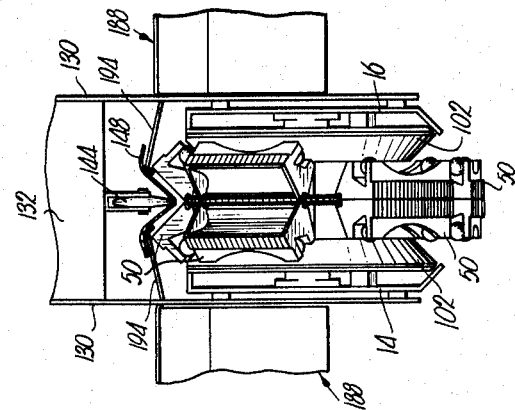
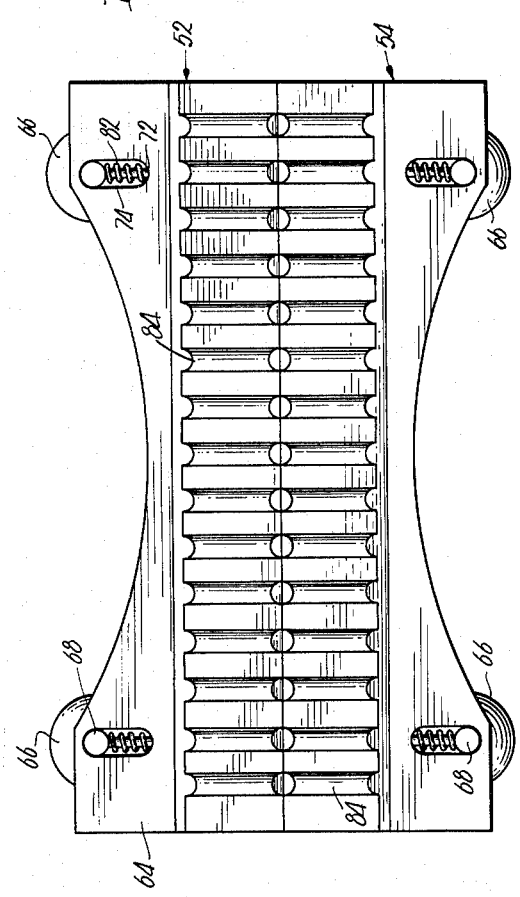
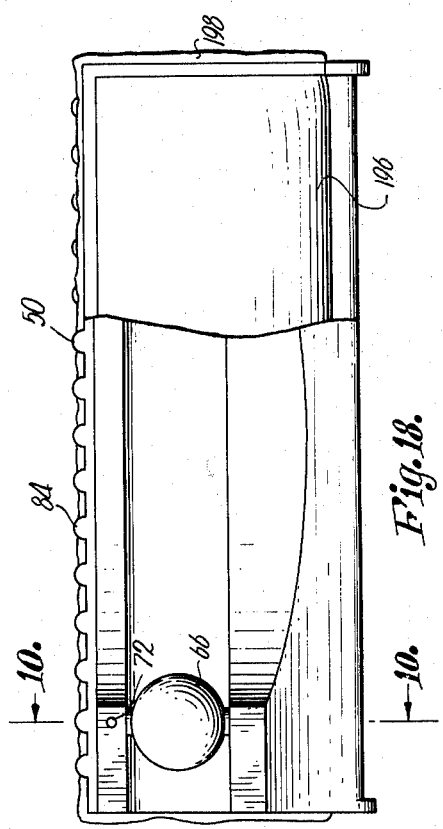
INVENTORS.
Robert D. Crawford
Glen R. Lenagar
Ralph S. Zebarth
BY
ATTORNEYS.

United States Patent Office 3,247,644
Patented Apr. 26, 1966

3,247,644
PARTS PACKAGING MACHINE
Robert D. Crawford, Parkville, Mo., Glen R. Lenagar, Prairie Village, Kans., and Ralph S. Zebarth, Hickman Mills, Mo., assignors to Gordon Johnson Company, Kansas City, Mo., a corporation of Missouri
Filed Aug. 20, 1962, Ser. No. 218,076
5 Claims. (Cl. 53—182)

This invention relates to article packaging means, and more particularly, to a machine for use in the poultry processing industry for packaging edible giblets.

Poultry processors generally place the edible giblets of an eviscerated bird within the body cavity of the bird to assure that the giblets remain with the bird until the latter is prepared for consumption. Heretofore, giblets have been manually wrapped in paper, but such an operation is time-consuming, tedious, and unsatisfactory because the giblets become unpackaged and separated within the bird when the wrapping paper becomes wet and deteriorates as a result.

The above disadvantages are overcome by the present invention which provides a machine for packaging articles such as the various giblets of an eviscerated bird, in a single package formed from a sheet of flexible, heat-sensitive, water impervious material after the articles have been placed on the sheet. The sheet is then subjected to heat to almost instantaneously seal opposed marginal edges thereof to thereby seal the articles therewithin. A large number of such packages may be formed in a given unit of time and the packages themselves are of a size and shape suitable for placement within the body cavity of an eviscerated bird.

It is, therefore, the primary object of the present invention to provide a machine capable of overcoming the aforesaid disadvantages and accomplishing the above-mentioned purposes, and which is provided with novel conveyor means thereon for advancing a number of buckets carrying the wrapping material and articles to be packaged into a region at an elevated temperature, whereby the sealing action takes place and the articles are packaged in an extremely short time, thus rendering the machine especially suitable for use in the poultry processing industry for the packaging of edible giblets.

Another object of the present invention is the provision of buckets, each of which is provided with a pair of sections which swing toward and away from each other to open and close the buckets under the action of the force of gravity, depending upon the location of the buckets on the conveyor, whereby the buckets may be made to open for receiving the articles to be packaged and the wrapping material, and to be opened for discharging the packaged articles after passing through the heated region.

Another object of the present invention is the provision of a machine of the kind described which is provided with structure for tightly closing the buckets by moving the sections thereof together prior to and during the time the buckets travel into the heated region, whereby exposed edges of the packaging material are subjected to the heat to seal the edges to form the packages, while the remainder of the material within the sections is protected from the heat and thus remains intact.

Yet another object of the present invention is the provision of mechanism on the machine adjacent the path of travel of the buckets for magnetically attracting the sections after the buckets have passed out of the heated region whereby the buckets are caused to be opened to permit the discharge of the packages carried thereby into suitable collection means adjacent the machine.

Other objects of the present invention will become apparent as the following specification progresses, reference being had to the accompanying drawings, wherein:

FIGURE 1 is a side elevational view of the packaging machine which forms the subject of the present invention;

FIG. 2 is an enlarged, fragmentary, plan view of one end of the machine illustrated in FIG. 1, parts being in section to illustrate details of construction;

FIG. 3 is an enlarged, fragmentary, plan view of the opposite end of the machine, parts being in section to illustrate details of construction;

FIG. 4 is an enlarged, cross-sectional view taken along line 4—4 of FIG. 1;

FIG. 5 is an enlarged, fragmentary, cross-sectional view taken along line 5—5 of FIG. 1;

FIG. 6 is an enlarged, fragmentary, cross-sectional view taken along line 6—6 of FIG. 1;

FIG. 7 is a fragmentary, cross-sectional view of the heater for producing a region at an elevated temperature adjacent the path of travel of buckets carrying a heat-sensitive web folded upon itself for shrinking the top and side edge portions of the web to form a package thereby;

FIG. 8 is a fragmentary, enlarged, side elevational view of a pair of bucket-engaging tracks having magnetic means thereon for magnetizing the tracks to thereby attract a corresponding swingable section of each of the buckets to open the latter;

FIG. 9 is an end view of the tracks illustrated in FIG. 8;

FIG. 10 is a cross-sectional view taken along line 10—10 of FIG. 18, and illustrating the swingable sections of a bucket;

FIG. 11 is an enlarged, fragmentary, side elevational view of a portion of a chain link conveyor coupled with the buckets for moving the latter horizontally;

FIG. 12 is a fragmentary plan view of structure used for connecting the conveyor with one end of a bucket;

FIG. 13 is an enlarged, fragmentary, side elevational view of the means for supporting an elongated web in the form of a roll adjacent the loading station of the machine;

FIG. 14 is a fragmentary, side elevational view of one end of the machine and illustrating the drive mechanism therefor;

FIG. 15 is a perspective view of the package of the type formed by the present invention;

FIG. 16 is an enlarged, fragmentary, end elevational view of the machine looking in the direction of movement of the buckets as the same progress toward the loading station;

FIG. 17 is an enlarged plan view of a bucket; and

FIG. 18 is a side elevational view of a bucket, parts being broken away to illustrate the relative position of a web therein.

The present invention provides a machine which includes an elongated conveyor in the form of a flexible, endless chain trained over a pair of spaced journals rotatable about parallel, horizontal axes. A number of buckets having swingable sections are mounted on the conveyor for movement therewith, the sections being designed to open and close the buckets under the action of the force of gravity, depending upon the location of the buckets on the conveyor. An elongated, heat-sensitive, water impervious, flexible web of sheet material is caused to be carried by the buckets in one direction and to line the sections prior to the movement of the buckets into a region at an elevated temperature. The buckets are caused to be open when the sections receive the sheet material so that articles to be packaged, such as the various giblets of an eviscerated bird, may be placed manually on the sheet prior to the closing of the buckets.

Structure is provided for urging the sections of each bucket together to close the bucket prior to the movement of the latter throught the heated region. Portions of the sheet material extend outwardly from the bucket and are exposed to the heat in the region as the buckets pass therethrough. The heat shrinks the edges to seal the same and thereby form the packages with the articles therewithin.

Magnetic mechanism adjacent the path of travel of the buckets and spaced from the heated region, open the buckets by attracting the sections and causing the latter to swing apart. The packages are then permitted to gravitate from the buckets into collection means adjacent the machine.

The buckets travel along the uppermost stretch of the conveyor to receive the web and to expose the edges of the latter to the heat in said heated region. The buckets travel along the lowermost stretch in a closed condition toward the loading station.

An article-packaging machine 10 is illustrated in FIG. 1 and comprises a support 12 including a pair of horizontally spaced, generally upright, elongated panels 14 and 16 disposed above a supporting surface by means of a number of legs 18 secured to the outer surfaces of panels 14 and 16. A number of interconnecting members 19 as illustrated in FIG. 5, interconnect panels 14 and 16.

A flexible conveyor 20, as is clear in FIG. 14, includes an elongated, endless link chain 22 trained over horizontally spaced journals 24 and 26. Journal 26 is best illustrated in FIG. 6 of the drawings. Journal 24 includes a shaft 28 rotatably mounted in, and spanning the distance between panels 14 and 16. A sprocket 30 is carried by shaft 28 for rotation therewith.

Journal 26 includes a sprocket 32 carried by a shaft 34 journalled in and spanning the distance between panels 14 and 16 as is clear in FIG. 6. Chain 22 is trained over sprockets 30 and 32 for movement in one direction. Chain 22 is, therefore, provided with an uppermost stretch 36 and a lowermost stretch 38.

Drive means for conveyor 20 includes a motor 40 secured to the inner surface of panel 14 and operably coupled with a gear reduction mechanism 42 adjacent motor 40 and also secured to panel 14 on the inner surface of the latter. A drive belt 44 interconnects motor 40 with mechanism 42. A flexible, endless chain 46 operably couples mechanism 42 with shaft 28 by means of a sprocket 48 on the latter. Energization of motor 40 therefore, actuates mechanism 42, which in turn rotates shaft 28 to cause sprocket 30 to rotate in a clockwise sense when viewing FIG. 14.

A series of buckets 50 is mounted on conveyor 20 in the manner illustrated in FIGS. 2 and 3, and each bucket is comprised of a pair of identical sections 52 and 54. Since sections 52 and 54 are identical, the description of one will suffice for the description of the other.

Section 52 is provided with an elongated base portion 56, a pair of opposed, generally triangular end portions 58, and an elongated side portion 60 spaning the distance between and interconnecting corresponding marginal edges of end portions 58. Section 52, therefore, provides a triangularly-shaped cavity by virtue of portions 56, 58 and 60. A boss 62 projects outwardly from the junction of portions 56 and 60 as is clear in FIG. 10. A projection 64 extends laterally from the normally uppermost marginal edge of portion 60 at each end of the latter.

Antifriction means 66 in the nature of a ball rotatably mounted on a rod 68, spans the distance between boss 62 and the outermost end of projection 64. Rod 68 is provided with an opening 70 therethrough for receiving a shank 72. Projection 64 is also provided with a slot 74 therethrough adjacent the outermost end thereof, and a bore 76 for receiving shank 72. Bore 76 is countersunk and threaded at 78 for receiving the threaded head 80 of shank 72. A coil spring 82 is carried by projection 64 within slot 74 thereof and bears against the normally uppermost end of rod 68 to force the latter away from portion 60 of section 52. Spring 82, therefore, provides resilient means for urging antifriction means 66 outwardly with respect to side portion 60.

A number of parallel, elongated bosses 84 are disposed on the normally uppermost surface of projection 64 as is clear in FIGS. 10, 17 and 18. Bosses 84 extend from the uppermost marginal edge of side portion 60 to a point outwardly spaced therefrom.

In FIGS. 10, 11 and 12, the manner of interconnecting buckets 50 with conveyor 20 is illustrated. A pair of adjacent links 86 and 88 are provided with a pair of ears 90 and 92 respectively for receiving therebweteen a plurality of washers 94 and 96 respectively. A U-shaped coupler 98 passes through each set of washers 94 and 96 and through aligned openings in the corresponding end portions 58 of sections 52 and 54 on the adjacent bucket 50. Suitable fastening means 100 maintain couplers 98 secured to the corresponding buckets 50. As shown in FIG. 11, a pair of adjacent buckets 50 is mounted at each end in the same manner so that the sections 52 and 54 of each bucket are mounted for swinging movement toward and away from each other about axes parallel with the path of travel of the conveyor. Each bucket 50 presents a hollow chamber when the sections are together in a closed position.

It is to be noted that the center of gravity of each section 52 and 54 is located on side portion 60 thereof. It is, therefore, evident that when each bucket 50 is on the uppermost stretch 36 of chain 22, sections 52 and 54 thereof tend to swing apart to thereby open the bucket 50. When each bucket 50 is on the lowermost stretch 38 of chain 22, the corresponding sections 52 and 54 tend to swing together and thereby close the buckets so long as the same remains on the lowermost stretch 38.

A pair of arcuate tracks 102 is carried by panels 14 and 16 at the end thereof at which sprocket 32 is disposed. Each track 102 is substantially semicircular and is coextensive with a pair of horizontally disposed tracks 104 carried in any suitable manner by panels 14 and 16 on either side of the path of travel of conveyor 20 and adjacent the uppermost stretch 36 thereof.

Tracks 102 have inclined faces which merge with the inclined faces of tracks 104. As shown in FIG. 16, buckets 50 tend to open as the same move upwardly about sprocket 32 and sections 52 and 54 thereof move apart so that antifriction means 66 on each section 52 and 54, engages the corresponding track 102. Further movement of conveyor 20 causes antifriction means 66 to move onto tracks 104, while buckets 50 remain in an open condition. A pair of L-shaped support members 106 is carried by a threaded shaft 108 adjacent the path of travel of conveyor 20 for supporting the sections 52 and 54 of each bucket as the same move in the direction of travel of conveyor 20. Since the uppermost stretch 36 tends to sag as buckets 50 move in one direction, support members 106 prevent undue sagging of chain 22 by supporting the adjacent portions of sections 52 and 54 of each bucket 50.

A drum-like housing 110 is carried on panels 14 and 16 intermediate the ends of the latter. Housing 110 has a swingable section 112 thereon permitting access to the interior thereof. Tracks 104 extend to a location within housing 110 and intermediate the ends of the latter as is clear in FIG. 2. The inclination of tracks 104 gradually changes from the inclined positions thereof illustrated in FIG. 6 to vertical positions illustrated in FIG. 2. The purpose of this is to cause sections 52 and 54 of each bucket 50 to come together, to thereby close the corresponding bucket 50.

A pair of vertically spaced, generally parallel rods 114 is provided on each side of the path of travel of conveyor 20 and merges with the adjacent ends of tracks 104 as is clear in FIG. 2. Rods 114 extend to a position adjacent and above sprocket 30 of journal 24 as is clear in FIG. 2. The ends of rods 114 opposite to the ends merging with tracks 104, are caused to merge with a pair of semicircular tracks 116 and 118 as is clear in FIG. 2. The diameter of tracks 116 is greater than the diameter of tracks 118, and each track 116 and 118 is provided with an inclined face substantially equal to the inclination of the inclined faces of tracks 102.

As buckets 50 advance along the uppermost stretch 36 of chain 22, the sections 52 and 54 of each bucket are caused to move toward each other by virtue of the change in inclination of tracks 104. Rods 114 maintain buckets 50 in closed conditions until the buckets pass about tracks 116 and 118.

As illustrated in FIGS. 8 and 9, mechanism 120 is operably coupled with tracks 116 and 118 on each side of conveyor 20 for assuring that the buckets open at a zone adjacent journal 24. Mechanism 120 includes a permanent magnet 122 secured by brackets 124 to tracks 116 and 118. Tracks 116 and 118 are, therefore, magnetized and remain so as long as magnet 122 is coupled therewith. Tracks 116 and 118 are, therefore, capable of attracting sections 52 and 54 of each bucket 50 to open the bucket and maintain the same open so long as the bucket is in proximity to tracks 116 and 118.

As is clear in FIG. 4, a pair of magnets 122 is provided for each pair of tracks 116, one of the magnets being located adjacent the uppermost ends of tracks 116 and 118 and the other magnet being located adjacent the lowermost ends of tracks 116 and 118. A wheel 126 of impact resistant material is carried between downwardly projecting arms 128 secured to panels 14 and 16, as is clear in FIG. 1. Wheel 126 is located directly below conveyor 20 and is disposed to prevent the slamming of sections 52 and 54 together as the buckets close under the action of the force of gravity.

A pair of upright panel elements 130 is carried on panels 14 and 16 at the ends thereof adjacent journal 26. Elements 130 extend upwardly from the uppermost edges of panels 14 and 16 and are interconnected by a plate 132, as is clear in FIGS. 3 and 6. As is shown in FIG. 13, each panel element 130 is provided with a pair of L-shaped supporting members 134 and 136 thereon. Each member 134 and 136 is provided with a recess 138 thereon at the junction of the L thereof for seating the corresponding end of a shaft 140. Supporting members 134 and 136 are thus capable of supporting a pair of reels 142 of packaging material, members 134 and 136 being spaced apart a distance sufficient to prevent contact of reels 142.

A wheel 144 is carried on the lower end of a rod 146 swingably mounted on the uppermost end thereof on plate 132 as is clear in FIGS. 1, 3 and 6.

In FIGURE 1, a web 148 of flexible, water impervious, transparent, heat resistant material is carried by reel 142 and trained over rods spanning the distance between panel elements 130. Web 148 emerges from between elements 130 at a location below the lowermost edge of plate 132 and wheel 144 is positioned to form a V-shape in web 148.

Web 148 is normally disposed between the open sections 52 and 54 of buckets 50 and is urged forwardly therewith by being clamped between a pair of sections 52 and 54 disposed within housing 110.

A cutting knife 150 is movable transversely of the path of travel of conveyor 20 between buckets 50 to sever web 148 so that each bucket 50 carries an individual length of said web. Knife 150 is secured at one end thereof to a shaft 152 which projects into housing 110 as is clear in FIG. 2. Shaft 152 is carried by bearings 154 on a platform 156 overlying the path of travel of conveyor 20. Gear means 158 interconnects shaft 152 with a shaft 160 journalled on platform 156 and disposed transversely of shaft 152. As is clear in FIG. 14, a flexible link chain 162 interconnects shaft 160 with mechanism 42 so that knife 150 may be rotated about shaft 152 upon energization of motor 40. Gear means 158 is selected to permit a complete revolution of knife 150 during the time required for the passage of an individual bucket 50 past a given point.

A heating device 164 is carried by panels 14 and 16 between housing 110 and journal 24 as is clear in FIG. 1. Heating device 164 comprises a housing 166 having forced air conduit means 168 therein and return conduit means 170 adjacent conduit means 168. A blower 172 operated by a motor 174, directs air under pressure into conduit means 168 and into a pair of L-shaped ducts 176 having louvered openings 178 therein for directing air outwardly therefrom toward the path of travel of buckets 50. A heating element 180 in the nature of an electrically heated coil, is disposed within conduit means 168 to heat the air passing through the latter. A pair of side walls 182 and a pair of end walls 184, depend from housing 166 and provide a region 186 at an elevated temperature by virtue of the heated air passing outwardly from the ducts 176. Air from region 186 is caused to return to the suction side of the blower 172 through conduit means 170 which is in fluid communication with region 186.

A loading tray 188 is carried by each panel 14 and 16 between housing 110 and journal 26 as is clear in FIGS. 1 and 3. Tray 188 has a perforated plate 190 on either side of a divider 192 so that articles to be packaged may be placed in a separated condition on plates 190. In the case of edible giblets, water from the giblets may be allowed to drain therefrom into the lower part of tray 188 through the perforated plates 190 thereof. An elongated, normally horizontal disposed panel 194 is carried by each tray 188 and extends toward the path of travel of conveyor 20. Panel 194 overlies portions of the corresponding section of each bucket 50 as is clear in FIG. 6, to prevent the closing of the buckets 50 while the same are in the zone adjacent trays 188.

In operation, conveyor 20 is actuated by energizing motor 40. Sprocket 30 is then caused to rotate in a clockwise sense when viewing FIG. 14 to thereby move the buckets 50 from journal 26 toward journal 24 along the uppermost stretch 36 of chain 22. Initially, the operator of machine 10 pulls web 148 until the same is clamped between one of the buckets 50 in the zone within housing 110. To accomplish this, section 112 is swung upwardly to gain access to housing 110 and the end of web 148 manually positioned between the sections of one of the buckets 50.

Motor 174 is also energized as well as heating elements 180 to direct heated aid into, through and out of ducts 176 toward buckets 50 as the same move toward journal 24.

Web 148 is caused to move between the sections of buckets 50 in the form of a V-shape by virtue of the presence of wheel 144. Loading operators standing adjacent trays 188, may then manually place articles to be packaged, such as edible giblets or the like, into the V-shaped web as the same moves toward housing 110. Panels 194 prevent closing of the sections and thereby prevent injury to the hands of the loading operators. Web 148 is of a width which permits marginal edge portions thereof to project outwardly from the buckets as is clear in FIG. 16. Also, end portions of web 148 project outwardly from the buckets after the web has been severed by knife 150.

Buckets 50 move into region 186 where the heated air causes the outwardly projecting marginal edge portions of the length of web carried by each bucket 50 to shrink and thereby seal the edges to form the package with the articles therewithin.

Buckets 50 open by virtue of the sections 52 and 54 thereof being attracted by the magnetized tracks 116 and 118. The packages within buckets 50 are then permitted to gravitate out of the buckets and toward a collection area below machine 10. As buckets 50 move along the lowermost stretch 38 of chain 22, sections 52 and 54 thereof move toward each other under the action of the force of gravity. Wheel 126 prevents damage to the sections by preventing the sections from being slammed together.

Buckets 50 travel along the lowermost stretch 38 in a closed condition to prevent the introduction thereinto of foreign particles such as dirt, dust or the like. As buckets 50 move about journal 26, the sections 52 and 54 thereof swing apart in the manner illustrated in FIG. 16 and once again, buckets 50 are in position for receiving web 148 and the articles to be packaged.

Bosses 84 are provided on sections 52 and 54 to prevent the corresponding marginal edge portions of the web carried thereby to adhere to the upper surface of the sections. This permits the heated air to flow under the upwardly projecting edge portions of the web to thereby assure that the edge portions are shrunk to seal the package formed by the web.

A package 196 of the type formed by machine 10 is illustrated in FIG. 15. It is noted that package 196 is provided with a U-shaped bead 198 thereon formed by the shrinking of the top and side marginal edge portions thereof.

It is noted that rods 68 carried by sections 52 and 54, are permitted to shift inwardly when antifriction means 66 engages the corresponding rods 114 adjacent the path of travel of conveyor 20. This assures that sections 52 and 54 are tightly forced together during the time that buckets 50 pass through region 186. As illustrated in FIG. 4, the antifriction means 66 is positioned between the corresponding rods 114 to prevent sagging in the uppermost stretch 36 of chain 22 during the time which buckets 50 traverse region 186.

Having thus described the invention, what is claimed as new and desired to be securd by Letters Patent is:

1. In a packaging machine,
  (a) a continuous, flexible conveyor;
  (b) a pair of spaced journals supporting the conveyor and rotatable about horizontal, parallel axes, presenting an uppermost and a lowermost stretch in the conveyor;
  (c) a series of buckets mounted on the conveyor throughout the length thereof, each including a pair of cup-like sections, each of said sections having a substantially continuous marginal edge and being secured adjacent one marginal edge thereof to the conveyor for swinging movement toward and away from the other section about an axis aligned with the path of travel of the conveyor, said sections being movable into and out of closed positions with the marginal edges of one of the sections adjacent the marginal edges of the other section, whereby each bucket presents a hollow, enclosed chamber when the sections are together in said positions, said sections having centers of gravity disposed to maintain the same closed when disposed along the lowermost stretch and open when disposed along the uppermost stretch;
  (d) structure extending along a portion of the uppermost stretch and engageable by said sections as the latter are advanced for closing and maintaining the sections closed for a predetermined distance of travel of the buckets along the uppermost stretch,
  each bucket presenting a pair of opposed, outermost sides when the sections thereof are in said closed positions,
  said structure being substantially horizontally aligned with said sides;
  antifriction means carried on said sides and interposed between the sections and said structure; and
  resilient means interposed between said antifriction means aid said sections whereby the sections are yieldably held in the closed position by said structure.

2. An article-packaging machine comprising:
  (a) an elongated support;
  (b) a continuous, flexible conveyor;
  (c) a pair of spaced journals carried by said support and supporting the conveyor thereon, said journals being rotatable about horizontal, parallel axes presenting an uppermost and a lowermost stretch in the conveyor;
  (d) a series of buckets mounted on the conveyor throughout the length thereof, each including a pair of cup-like sections secured to the conveyor for swinging movement toward and away from each other about axes aligned with the path of travel of the conveyor, whereby each bucket presents a hollow chamber when the sections are together in a closed position, said sections having centers of gravity disposed to maintain the same closed when disposed along the lowermost stretch and open when disposed along the uppermost stretch;
  (e) structure carried by the support and extending along a portion of the uppermost stretch, said structure being engageable by said sections as the latter are advanced for closing and maintaining said sections closed for a predetermined distance of travel of the buckets along the uppermost stretch;
  (f) means on said support adjacent one end thereof for containing a supply of an elongated web of flexible, heat-sensitive material, said web adapted to be disposed within the chambers of said buckets to receive thereon the articles to be packaged and movable with said buckets, there being marginal edge portions of the web projecting outwardly from the buckets when the latter engage said structure;
  (g) knife means for severing the web between adjacent buckets; and
  (h) convective heater means on said support adjacent the opposite end thereof for subjecting said outwardly projecting portions of said web to heat sufficient to cause the portions to shrink to seal the edges of the web together as said buckets move toward said opposite end of the support, whereby said articles are sealed within the web.

3. A method for packaging articles comprising:
moving an elongated, flexible, heat-sensitive web along a horizontal path of travel while the web is folded along a longitudinal median line to form an open trough-like receptacle having a pair of sides;
depositing an article on the web and thereby in the receptacle as the web continues to move along said path;
closing the receptacle to enclose the article by folding the web until the portions of said sides disposed about the article are in contact with each other;
severing the segment of said web defining said receptacle from the remainder of the web to form a margin for each side of the receptacle outwardly of said portions; and
subjecting said margins to convective heat sufficient to cause the margins to fuse together to seal the article in said receptacle.

4. In a packaging machine,
a continuous, flexible conveyor;
a pair of spaced journals supporting the conveyor and rotatable about horizontal, parallel axes, presenting an uppermost and a lowermost stretch in the conveyor;
a series of buckets mounted on the conveyor throughout the length thereof, each including a pair of cup-like sections, each of said sections having a substantially continuous marginal edge and being secured adjacent one marginal edge thereof to the conveyor for swinging movement toward and away from the other section about an axis aligned with the path of travel of the conveyor, said sections being movable into and out of closed positions with the marginal edges of one of the sections adjacent the marginal edges of the other section whereby each bucket presents a hollow, enclosed chamber when the sections are together in said positions, said sections having centers of gravity disposed to maintain the same closed when disposed along the lowermost stretch and open when disposed along the uppermost stretch;

structure extending along a portion of the uppermost stretch and engageable by said sections as the latter are advanced for closing and maintaining the sections closed for a predetermined distance of travel of the buckets along the uppermost stretch; and mechanism adjacent one of said journals and extending longitudinally of said path of travel for opening the buckets and maintaining the same open for a portion of the distance of travel of the bucket around said one journal as the buckets move from the uppermost stretch to the lowermost stretch.

5. The invention of claim 4, said mechanism including magnetic attraction means adjacent said one journal, said sections each having a portion thereof provided with material sensitive to the attraction of said magnetic means.

References Cited by the Examiner

UNITED STATES PATENTS

| | | |
|---|---|---|
| 1,751,869 | 3/1930 | Mayne. |
| 2,014,468 | 9/1935 | Clayton _____ 18—4 |
| 2,394,901 | 2/1946 | Eaton _____ 53—179 X |
| 2,475,617 | 7/1949 | Irmscher _____ 53—28 |
| 2,606,850 | 8/1952 | Piazze _____ 53—373 X |
| 2,649,674 | 8/1953 | Bartelt _____ 53—183 |
| 2,691,474 | 10/1954 | Olson _____ 53—373 X |
| 3,071,906 | 1/1963 | Zebarth et al. _____ 53—184 X |

FRANK E. BAILEY, *Primary Examiner.*

BROMLEY SEELEY, *Examiner.*